Patented May 23, 1939

2,159,312

UNITED STATES PATENT OFFICE 2,159,312

PROCESS FOR BREAKING OIL-IN-WATER TYPE PETROLEUM EMULSIONS

Charles M. Blair, Jr., Webster Groves, Mo., assignor to The Tret-O-Lite Company, Webster Groves, Mo., a corporation of Missouri No Drawing. Application December 13, 1937, Serial No. 179,471

11 Claims. (Cl. 196—4)

This invention relates to the treatment of a certain peculiar kind of naturally occurring crude oil emulsion and has for its main object to provide a practicable process for separating the water and oil contained in said peculiar emulsion.

The vast majority of petroleum emulsions are of the water-in-oil type and comprise fine droplets of naturally occurring waters or brines dispersed in a more or less permanent state throughout the oil, which constitutes the continuous phase of the emulsion. They are obtained from producing wells and from the bottom of oil storage tanks, and are commonly referred to as "cut oil", "roily oil", "emulsified oil", and "bottom settlings". The present invention is not concerned with the treatment of such conventional water-in-oil type petroleum emulsions.

In certain oil fields, there are produced crude oil emulsions which, instead of being of the water-in-oil type, are of the oil-in-water type, and comprise fine droplets of naturally occurring petroleum oil dispersed in a more or less permanent state throughout the water or relatively dilute brine, which constitutes the continuous phase of the emulsion. As far as I am aware, the expressions "cut oil", "roily oil", etc. commonly used to designate conventional water-in-oil emulsions, are not used to designate or refer to the peculiar oil-in-water petroleum emulsions which my improved process is capable of successfully treating to recover the oil contained in same.

Although such peculiar emulsions are recognized technically as being of the oil-in-water type, their physical-chemical constitution is only partially understood. It is recognized that one may have emulsions of the oil-in-water type in which the dispersed phase is present to the extent of a few tenths of 1%, or less, in which the stability of the emulsion appears to be predicated on factors other than the presence of a significant amount of a conventional emulsifier; that is, factors such as particle size, electric charge, etc. It is also known that emulsions of the oil-in-water type may exist in which the dispersed phase represents a significant proportion of the total emulsion; for instance, from 3% to 5% of the emulsion, up to 60% to 70%, or even more, provided that there is a protective colloid or conventional emulsifying agent present. However, as far as I am aware, technologists have not been confronted with a type of oil-in-water emulsion in which there was dispersed a significant portion of the oily phase in what appears to be a substantially complete absence of a protective colloid or equivalent thereof. To this extent, although not necessarily due to this factor alone, these particular or peculiar oil field emulsions, namely, the naturally occurring oil-in-water emulsions having a significant proportion of dispersed phase and a substantially complete absence of a protective colloid or equivalent substance appear to be substantially a new type of emulsion that requires a new method of treatment, in order to separate them economically and rapidly into their component parts, and thus permit the recovery of dry or merchantable oil.

It is to be emphasized that the external phase or continuous phase of these peculiar naturally occurring petroleum emulsions consists of water or a relatively dilute brine that apparently does not froth, that apparently has a normal surface tension, and which on evaporation, does not appear to yield a substance having the characteristic properties of hydrophile protective colloids or common emulsifying agents for the oil-in-water type of emulsion.

The copending application of Charles M. Blair, Jr. and Charles Clinton Rogers, Jr., Serial No. 179,472, filed December 13, 1937, discloses that these unusual emulsions may be separated into their component parts of oil and water by treatment with a minimal concentration of a multipolar, substantially un-ionized hydrophile colloid.

I have discovered that these unique emulsions having these peculiar characteristics can be treated more rapidly and at a lower temperature and with the separation of somewhat clearer oil and water phases, if they are treated with a mixture containing a multipolar, substantially un-ionized hydrophile colloid of the kind hereinafter described, and an electrolyte of the kind hereinafter described.

Effective hydrophile colloids which may be used in the mixture employed as the treating agent or demulsifying agent of my process, are those which give rise only to very small electrical effects when adsorbed at interfaces. In general, they are either the weakly ionized, amphoteric, or un-ionized hydrophile colloids, and are further characterized by the fact that they contain a multiplicity of polar groups, such as —COOH, —COOR, R—O—R, —OH, —NH$_2$, —NRH, NR$_2$ —CO—NH—, etc., where R is a univalent organic radical. It may happen that all the polar groups which are present in a hydrophile colloid are of the same kind, or they may be of substantially different kinds, or they may be of several varieties which are generally related to each other. Such hydrophile colloids are characterized by the fact that the polar groups are not segregated at a particular point but are distributed more or less uniformly throughout the molecule, so that their solution or sol contains a body having what appears to be a more or less uniformly hydrated surface, although the chemical structure of the molecule indicates that the hydrated zones must be interrupted or alternated by non-hydrated zones or groups of non-polar or hydrophobe character.

This feature of distributed hydration along with the concomitant property of distributed hydrophobe characteristics, distinguishes these materials from other hydrophile colloids such as soaps, the molecules of which are considered as being made up of one definitely polar hydrated end, and one definitely non-polar, non-hydrated end. Inasmuch as these hydrophile colloids contain more than one polar group, they may be referred to as "multipolar" and may be defined as the multipolar, substantially un-ionized type of hydrophile colloid. The expression "substantially un-ionized" as herein used is intended to include the previously described hydrophile colloids which give rise to minimal electrical effects.

The colloidal dispersions of these hydrophile colloids are relatively non-sensitive to electrolytes, and they often form gels or very viscous, aqueous dispersions. Materials such as soaps, highly ionized dyes, and other relatively strong colloidal electrolytes, high molecular weight organic sulfates and sulfonates, are not included in this classification. Examples of materials having the properties which make them suitable for use as a demulsifying agent for breaking the peculiar oil-in-water type emulsion previously described are: glue, gelatin, casein, starch, albumin, tannin, dextrin, methyl cellulose, water soluble ethyl cellulose, *Prosopis juliflord* exudate, gum arabic, many other water dispersible gums, water dispersible urea-aldehyde resins, etc. In some instances, a mixture of two or more of such materials or colloids may be more effective than one alone. It is recognized that some of these products, such as starch, glue, or the like, produce degradation products which are similar in colloidal nature to their parent material. Obviously, such degradation products could be used with equal effectiveness. In order to designate only the desired type of hydrophile colloid and to exclude the unsuitable type, I will refer to the type employed as being substantially un-ionized. The expression "substantially un-ionized" is meant to include the type which is un-ionized or weakly ionized or amphoteric.

Electrolytes which have been found to be the most effective when used with the hydrophile colloids described above are those containing highly charged or relatively highly adsorbable cations, and may be either inorganic or organic compounds. In some cases, compounds containing cations such as Na+ or H+, bearing only one charge, when added to the emulsion described, along with a hydrophile colloid, have been found to give faster and cleaner separation of phases than can be obtained with a hydrophile colloid alone. However, among inorganic electrolytes, it has been found that compounds containing divalent, trivalent, tetravalent or higher valence cations, usually are the most effective. Organic compounds containing a large highly adsorbable cation, usually are quite effective in this mixture, regardless of valence.

Examples of electrolytes which I have found to be suitable for admixture with a hydrophile colloid of the kind previously described are: $NaCl$, $KCl$, $HCl$, $H_2SO_4$, $HNO_3$, $CaCl_2$, $MgCl_2$, $Ca(NO_3)_2$, $FeCl_3$, $Th(NO_3)_4$, $Ce(SO_4)_2$, $Mg(NO_3)_2$, $MgSO_4$, $Al_2(SO_4)_3$, $AlCl_3$, $FeSO_4$, $Fe(NO_3)_3$, methylene blue, fuchsin, many other basic dyes, perlargonidin chloride, cetyl pyridinium bromide, toluidine hydrochloride, diphenyl guanidine hydrochloride, benzyl pyridinium chloride, many other water soluble salts of strong or relatively strong organic bases of moderately high molecular weight, etc. Because of their low cost and availability, salts of alkaline earth metals and of iron, such as $CaCl_2$, $MgCl_2$, $MgSO_4$, $BaCl_2$, and $FeSO_4$, are usually employed.

The ratio of the hydrophile colloids to electrolyte which should be added to a given emulsion to give the optimum results, will depend somewhat upon the emulsion, the hydrophile colloid, and the electrolyte employed. Sometimes optimum results are obtained when ten times as much hydrophile colloid is used as electrolyte. In other cases, best results are obtained when only one-tenth or one-twentieth or even one-hundredth as much hydrophile colloid as electrolyte is used. When the hydrophile colloid used is glue and when the electrolyte used is $CaCl_2$, it has been found that the mixture containing one part of glue to four parts of $CaCl_2$ is effective on a number of emulsions. For the treatment of any particular emulsion, the proper proportions of hydrophile colloid and electrolyte to employ may be determined by a few simple tests. Taking glue and calcium chloride as an example of a mixture to be tested, the test may be made as follows:

Prepare five different solutions in water, all containing the same total percentage weight of material, but with one solution containing ten times as much glue as calcium chloride, another containing five times as much glue as calcium chloride, another containing equal weights of glue and calcium chloride, one containing five times as much calcium chloride as glue, and another containing ten times as much calcium chloride as glue. These stock solutions may be kept satisfactorily by the addition of a small amount of the proper preservative. Then add 100 mls. of the emulsion, on which these mixtures are to be tested, to each of 25 six-ounce bottles. Take one of the stock solutions and add sufficient of this solution to one of the emulsion samples to give a concentration of one part of the colloid-electrolyte mixture to about 100,000 parts of emulsion. To other samples of emulsion, add increasing amounts of this stock solution, so as to have bottles containing a ratio of colloid-electrolyte mixture of one part to 50,000 parts of emulsion, one part to 25,000 parts of emulsion, one part to 10,000 parts of emulsion, and one part to 5,000 parts of emulsion. Add amounts of each of the other stock solutions to samples of emulsion in the same manner to give the same ratios of colloid-electrolyte mixture to emulsion. After this has been done, shake all of the bottles for about two or three minutes and allow to stand. It will be found that one or two of the bottles containing a particular one of the stock solutions will show a quicker and cleaner separation of phases. Further tests should then be made in a similar manner, using this particular stock solution and other freshly made stock solutions containing ratios of hydrophile colloid to electrolyte which vary closely on either side of this one. By this elimination, it will be possible to select a ratio giving the optimum separation and also to select the proper concentration in which this material should be added to the emulsion. The proper ratio of hydrophile colloid to electrolyte in other mixtures containing ingredients different from these may be determined in the same manner.

The mixture that constitutes the preferred reagent or demulsifying agent of my process may be made as follows: In a container, place 45 pounds of glue or commercial gelatin, and 91 pounds of water. Warm this container and stir the contents until a homogeneous mixture is obtained. In another container place 213 pounds of $CaCl_2.2H_2O$ and 193 pounds of water, and stir until the $CaCl_2.2H_2O$ has gone completely into solution. Then pour the glue or commercial gelatin solution prepared in the first container into the calcium chloride solution and stir until a homogeneous mixture is obtained. Then add five pounds of methyl salicylate or five pounds of a concentrated zinc chloride solution which acts as a preservative. Any compatible coloring matter or odorant may be added, if desired. In some cases, alcohol, ether, or other inert organic liquids may be added to lower the viscosity and improve the physical properties of the material.

In using the above described reagent to treat or break the peculiar oil-in-water type emulsion previously described, the reagent is added to the emulsion to be treated in the same manner and by the procedure commonly employed in processes in which demulsifying agents are used for treatment of conventional oil field emulsions. It should be added in approximately the amount required as determined by the test given above, but in general a reasonable excess over this amount is not objectionable in any way other than that the cost of treating the emulsion is thereby increased.

Having thus described my invention, what I claim as new and desire to secure by Letters Patent is:

1. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar, substantially un-ionized colloid of distributed hydrophilic character, and (b) an electrolyte; and characterized by the fact that ratios of (a) to (b) are within the range of 10 to 1 and 1 to 100, the said demulsifier being used in a ratio of less than one part of demulsifier to 1,000 parts of emulsion.

2. A process of the kind described in claim 1, in which the minimum amount of demulsifier required to effect the separation of the component parts of the emulsion, is added to the emulsion.

3. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar, substantially un-ionized colloid of distributed hydrophilic character, and (b) an inorganic electrolyte; and characterized by the fact that ratios of (a) to (b) are within the range of 10 to 1 and 1 to 100, the said demulsifier being used in a ratio of less than one part of demulsifier to 1,000 parts of emulsion.

4. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar, substantially un-ionized colloid of distributed hydrophilic character, and (b) an electrolyte derived from a polyvalent metal; and characterized by the fact that the ratios of (a) to (b) are within the range of 10 to 1 and 1 to 100, the said demulsifier being used in a ratio of less than one part of demulsifier to 1,000 parts of emulsion.

5. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar, substantially un-ionized colloid of distributed hydrophilic character, and (b) an electrolyte derived from an alkaline earth metal; and characterized by the fact that ratios of (a) to (b) are within the range of 10 to 1 and 1 to 100, the said demulsifier being used in a ratio of less than one part of demulsifier to 1,000 parts of emulsion.

6. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar, substantially un-ionized carbohydrate type colloid of distributed hydrophilic character, and (b) an electrolyte derived from an alkaline earth metal; and characterized by the fact that ratios of (a) to (b) are within the range of 10 to 1 and 1 to 100, the said demulsifier being used in a ratio of less than one part of demulsifier to 1,000 parts of emulsion.

7. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar substantially un-ionized, naturally occurring gum type colloid of distributed hydrophilic character, and (b) an electrolyte derived from an alkaline earth metal; and characterized by the fact that ratios of (a) to (b) are within the range of 10 to 1 and 1 to 100, the said demulsifier being used in a ratio of less than one part of demulsifier to 1,000 parts of emulsion.

8. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multipolar, substantially un-ionized, protein type colloid of distributed hydrophilic character, and (b) an electrolyte derived from an alkaline earth metal; and characterized by the fact that ratios of (a) to (b) are within the range of 10 to 1 and 1 to 100, the said demulsifier being used in a ratio of less than one part of demulsifier to 1,000 parts of emulsion.

9. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multi-polar, substantially un-ionized, protein type colloid of distributed hydrophilic character, and (b) calcium chloride; and characterized by the fact that ratios of (a) to (b) are within the range of 10 to 1 and 1 to 100, the said demulsifier being used in a ratio of less than one part of demulsifier to 1,000 parts of emulsion.

10. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) a multi-polar, substantially un-ionized, protein type colloid of distributed hydrophilic character, and (b) calcium chloride; and characterized by the fact that ratios of (a) to (b) are within the range of 10 to 1 and 1 to 10, the said demulsifier being used in a ratio of less than one part of demulsifier to 1,000 parts of emulsion.

11. A process for breaking naturally occurring oil-in-water type crude petroleum emulsions that are substantially free from usual emulsifying agents and in which the dispersed phase represents a significant proportion of the total emulsion, characterized by subjecting the emulsion to the action of a demulsifier comprising (a) glue and (b) calcium chloride; and characterized by the fact that ratios of (a) to (b) are within the range of 10 to 1 and 1 to 10, to which has been added an appreciable amount of a suitable preservative, the said demulsifier being used in a ratio of less than one part of demulsifier to 1,000 parts of emulsion.

CHARLES M. BLAIR, Jr.

CERTIFICATE OF CORRECTION.

Patent No. 2,159,312.  May 23, 1939.

CHARLES M. BLAIR, JR.

It is hereby certified that error appears in the printed specification of the above numbered patent requiring correction as follows: Page 1, second column, line 48, in the formula, after "$NR_2$" and before "-CO-NH-" insert a comma; line 54, for the word "generally" read generically; page 2, first column, line 39, for "juliflord" read juliflora; and that the said Letters Patent should be read with this correction therein that the same may conform to the record of the case in the Patent Office.

Signed and sealed this 4th day of July, A. D. 1939.

Henry Van Arsdale (Seal)  Acting Commissioner of Patents.